US005537775A

United States Patent [19]

Crumrine

[11] Patent Number: 5,537,775
[45] Date of Patent: Jul. 23, 1996

[54] WEIGHTED JIG HOOK APPARATUS

[76] Inventor: Douglas L. Crumrine, 5333 Lynden Ave., Grand Island, Nebr. 68801

[21] Appl. No.: 394,621

[22] Filed: Feb. 27, 1995

[51] Int. Cl.⁶ .............................. A01K 83/00; A01K 85/00
[52] U.S. Cl. ............................................ 43/42.38; 43/42.39
[58] Field of Search .............................. 43/42.39, 42.37, 43/42.38, 43.16

[56]  References Cited

U.S. PATENT DOCUMENTS

| | | |
|---|---|---|
| 310,118 | 12/1884 | Bower . |
| 551,581 | 12/1895 | Crane . |
| 551,582 | 12/1895 | Crane . |
| 2,543,293 | 2/1951 | Leitch et al. ............................ 43/43.15 |
| 2,573,013 | 10/1951 | Herrick ..................................... 43/44.8 |
| 2,594,620 | 4/1952 | Braithwaite ............................. 43/43.12 |
| 2,651,133 | 9/1953 | Sharps ..................................... 43/43.16 |
| 2,741,057 | 4/1956 | Morris et al. ........................... 43/42.09 |
| 2,825,174 | 3/1958 | Leinonen ................................. 43/44.8 |
| 3,000,131 | 9/1961 | Stinson .................................... 43/44.6 |
| 3,137,960 | 6/1964 | Sharp ...................................... 43/42.09 |
| 3,205,609 | 9/1965 | Knapton .................................. 43/42.09 |
| 3,477,164 | 11/1969 | Novak ..................................... 43/42.09 |
| 3,750,323 | 8/1973 | Weis ........................................ 43/42.37 |
| 4,251,942 | 2/1981 | Jacobus ................................... 43/44.8 |
| 4,998,373 | 3/1991 | Braswell ................................. 43/42.37 |
| 5,090,151 | 2/1992 | Salminen ................................ 43/42.36 |
| 5,105,575 | 4/1992 | Roberaccio ............................. 43/44.8 |
| 5,339,559 | 8/1994 | Strobbe ................................... 43/42.37 |

*Primary Examiner*—Jack W. Lavinder
*Assistant Examiner*—Randolph S. Herrick
*Attorney, Agent, or Firm*—Law Offices of John A. Beehner

[57]  ABSTRACT

An improved weighted jig is disclosed having a fishhook with an elongated shank having first and second ends; a U-shaped hook secured to the first shank end. A shoulder is attached to the shank second end and extends generally perpendicularly from the shank. The shoulder is formed by a member having two ends and connected at one of the ends to the shank second end and folded back on itself. An eyelet for connection of a fishing line, is formed at the point of folding of the member back upon itself. A locking device is secured to the shoulder, the locking device being movable between a locking position and a release position. A weighted jig head comprising a body having a top and bottom and an axial bore therethrough is adapted to be placed on the hook such that upon placement of the locking device in the release position, the weight may be slid upwardly on the shank into contact with the shoulder at the top of the weight whereupon the locking device may be placed in the locking position releasably retaining the weight in place. The jig may also be configured with a spinner.

9 Claims, 1 Drawing Sheet

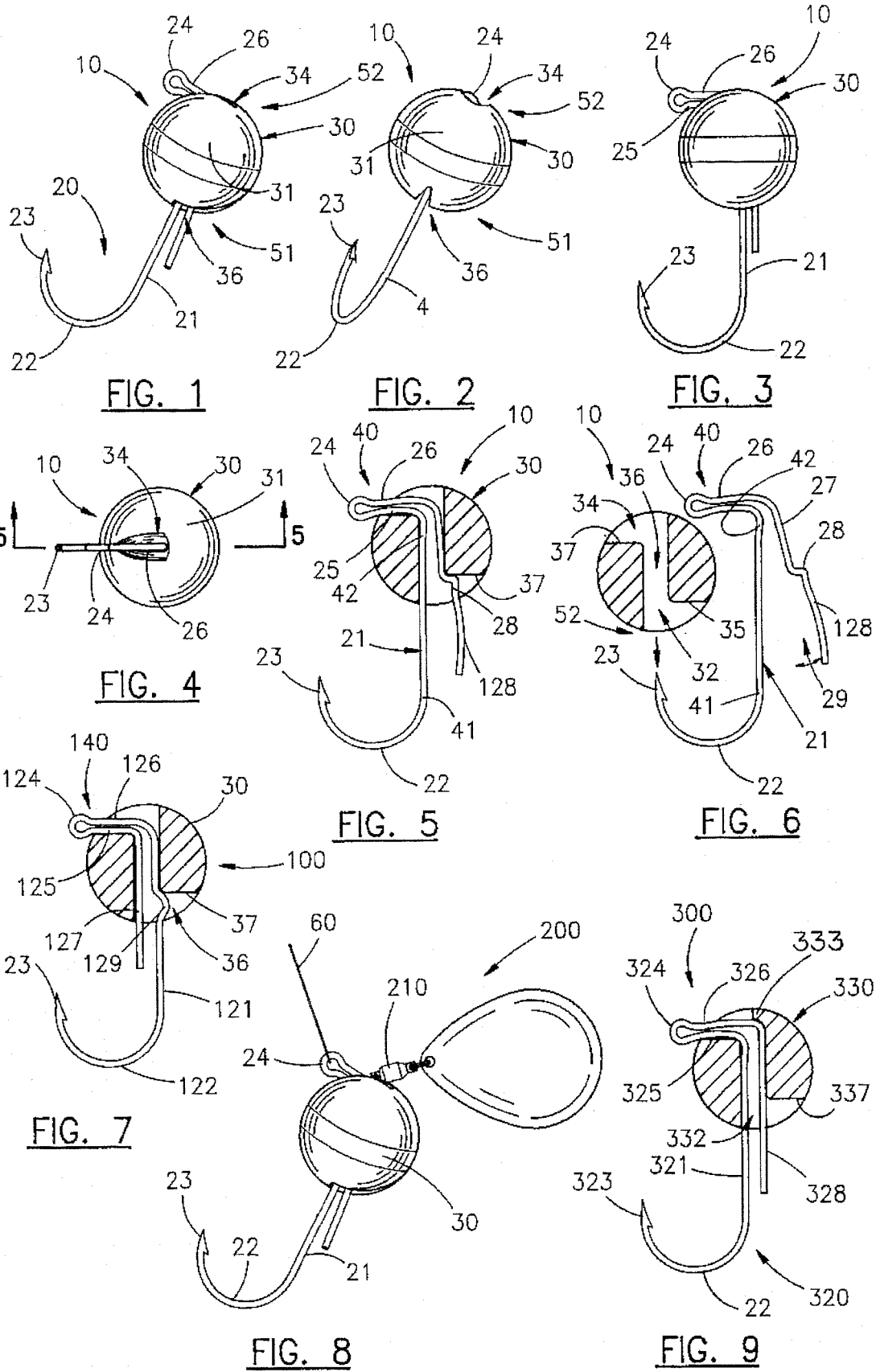

WEIGHTED JIG HOOK APPARATUS

BACKGROUND OF THE INVENTION

1. Technical Field

The present invention relates generally to fishing lures. More specifically, it relates to a unique weighted jig hook apparatus adapted to allow easy interchangability of the weight associated therewith.

2. Description of the Prior Art

It is an axiom of fishing that fishermen like to try different combinations of equipment in their never-ending quest to catch the bigger fish. The most commonly interchanged component is the lure being used.

It is a general rule when fishing that the type of lure and retrieval technique should be varied frequently until the right combination of lure and retrieval suited for the environmental existing at the time is found. Thus, anything which facilitates the change-out of lure components will expedite finding this combination and will be met with great acceptance in the art.

One of the more popular types of lures is the jig. The essential components of a jig are the head and the hook protruding therefrom and some type of eyelet for securing the jig to a fishing line. The hook protruding from the jig head is conventional in nature having a shank with a pointed bend in the lower portion thereof. The jig may be rigged in many different embodiments, one of the most popular being to engage a plastic worm, grub or other artificial lure thereon. In addition to providing a lifelike appearance to the rig, the head also serves a functional purpose as a weight. As is commonly understood in the art, a lure must be provided with a certain amount of weight so that it may be cast outwardly from the fisherman to the location fished.

Some commentators have indicated that jig fishing is becoming one of the most popular methods used. With jig fishing, it is the fisherman who creates the action on the lure. Thus, it is up to the fisherman to create a lifelike motion with the jig rig so as to attract the fish. As is well understood in the art, the amount of weight used in the jig head significantly effects the motion of the lure, and consequently its presentation to the fish. Thus, a great variation in presentation may be accomplished simply by changing the amount of weight associated with the jig rig. Therefore, a jig system which enhances the ease with which the jig head weight may be changed will facilitate the ability of the fisherman to create different presentations and have great utility in the art.

The vast majority of weighted jigs have weighted heads which are integrally formed with the hook thereof. Examples of conventional jig heads may be found in Strobbe, U.S. Pat. No. 5,339,559 and Braswell, U.S. Pat No. 4,998,373. In order to change the weight associated with these conventional jigs and presentation made thereby, the entire lure must be changed.

Additionally, the prior art teaches the use of hooks having a buoyant member which may be moved on the shank. For example, Jacobus, U.S. Pat. No. 4,251,942, discloses a double barbed fish hook for use with live bait and discloses a hook wherein the shank is doubled back on itself such that one portion of the wire runs adjacent the shank. However, there is no disclosure of a weighted jig. Similarly, Leidsch et al., U.S. Pat. No. 2,543,293, discloses a hook having a buoyant member which is longitudinally adjustable on the shank of the hook. There is no suggestion the buoyant member being removable from the hook. Additionally, of course the adjustable member is not weighted, rather it is buoyant to provide some flotation to the hook. Similarly, Novak, U.S. Pat. No. 3,477,164, discloses a fly fishing lure having a buoyant member which may be slipped onto the hook shank. Novak contemplates that the buoyant member would be removed for replacement by crushing the buoyant member and allowing it to simply fall off the hook shank.

Consequently, there is a great need for a jig fishing lure wherein the weight associated therewith may be easily changed out without removing the entire lure from the fishing line and thus facilitating alternative presentations which may be made by the fisherman.

Therefore, it is a primary objective of the present invention to provide a weighted jig hook fishing lure apparatus wherein the weight associated therewith is removably secured to the hook shank, facilitating the interchangability thereof.

It is a further objective that the invention provide a weighted jig hook wherein the hook comprises a releasable locking mechanism adapted to releasably secure a variety of different sizes and weights.

It is a further objective of the present invention to provide a weighted jig hook wherein the color of the weighted head may be replaced.

A further objective of the present invention is to provide a weighted jig hook wherein the weight may be altered to accommodate different environmental conditions such as increased weight in windy conditions or where the fishing depth is greater.

A still further objective of the present invention is to provide a weighted jig hook wherein the shape of the weighted head may comprise a plurality of shapes.

A still further objective is to provide a weighted jig hook wherein the weighted head may be constructed of a tin, bismuth or steel material.

A still further objective is to provide a weighted jig hook apparatus which is adapted for use on a variety of hook sizes and shapes.

A still further objective of the present invention is to provide a weighted jig hook apparatus wherein the locking means comprises a snap fit with the weighted head.

A final objective is to provide a weighted jig hook apparatus wherein a spinner may be attached thereto.

SUMMARY OF THE INVENTION

An improved weighted jig is disclosed having a fishhook with an elongated shank having first and second ends; a U-shaped hook secured to the first shank end. A shoulder is attached to the shank second end and extends generally perpendicularly from the shank. The shoulder is formed by a member having two ends and connected at one of the ends to the shank second end and folded back on itself. An eyelet for connection of a fishing line, is formed at the point of folding of the member back upon itself. A locking device is secured to the shoulder, the locking device being movable between a locking position and a release position. A weighted jig head comprising a body having a top and bottom and an axial bore therethrough is adapted to be placed on the hook such that upon placement of the locking device in the release position, the weight may be slid upwardly on the shank into contact with the shoulder at the top of the weight whereupon the locking device may be placed in the locking position releasably retaining the weight in place. The jig may also be configured with a spinner.

BRIEF DESCRIPTION OF THE DRAWING

FIG. 1 is a side perspective view of the weighted jig hook apparatus with the weighted head installed in the operational configuration.

FIG. 2 is a rear quarter view of the apparatus in the working configuration.

FIG. 3 is a side view of the weighted jig apparatus.

FIG. 4 is a top view of the weighted jig hook apparatus.

FIG. 5 is a side sectional view taken along the lines as indicated in FIG. 4.

FIG. 6 is a side cross-sectional view showing how the weighted head is installed on the hook.

FIG. 7 is a side cross-sectional view of an alternative embodiment of the weighted jig hook apparatus.

FIG. 8 is a side perspective view showing the weighted jig hook apparatus with a spinner installed thereon.

FIG. 9 is a side cross-sectional view of another alternative embodiment of the weighted jig hook apparatus.

DESCRIPTION OF THE PREFERRED EMBODIMENT

FIGS. 1 through 4 illustrate the external appearance of the weighted jig hook apparatus 10 of the present invention in its working configuration. As seen in these figures, the major components of the weighted jig hook apparatus 10 comprise the hook 20 and the weighted jig head 30. Shank 21 comprises first and second ends 41 and 42 respectively. As seen from the figures, the hook 20 passes generally through the center of weighted head body 31 such that the shank 21, and the U-shaped portion comprising bend 22, and point 23, project outwardly from the bottom 51 thereof. Similarly, the eyelet 24 protrudes outwardly from the top 52 of weighted jig head 30. Details of the hook 20 are discussed in more detail in conjunction with FIGS. 5 and 6 below.

The interconnection between the hook 20 and weighted head 30 is seen most clearly in FIG. 5. As seen in this figure, the weighted head 30 comprises an axial bore 32 through the center thereof. Additionally, weighted head 30 comprises two recesses 34 and 36 on the top 52 and bottom 51 thereof, respectively. Recesses 34 and 36 are defined by ledges 35 and 37, respectively. Ledges 35 and 37 are adapted to fit against shoulder 40 and a locking means securing the weighted head 30 in position on hook 20. In the preferred embodiment, the locking means is a locking tab 28. As is clear from the figure, contact between arm 25 and ledge 35 prevents downward movement of hook 20 relative to weight 30. Similarly, contact between locking tab 28 and ledge 37 prevents upward movement of hook 20 relative to weight 30.

As seen in the figure, shoulder 40 of hook 20 is defined by arms 25 and 26. In the preferred embodiment, shoulder 40 would be formed by bending at approximately the second end 42 thereof, of shank 21 at a right angle to the remaining portion of the shank thereby defining arm 25. A further portion of the shank would then be bent back on itself forming arm 26 and completing formation of shoulder 40. The point of bending would define eyelet 24, adapted for connection of the hook to a fishing line 60. The hook would further comprise a portion 27 which is bent back to be positioned adjacent shank 21 and generally parallel thereto. Finally, the hook would terminate in locking tab 28. Locking tab 28 in the preferred embodiment would be formed by creating a small bend in the end of the wire 27, as seen in the preferred embodiment of FIGS. 5 and 6.

It will be clear that the invention is not limited to any particular size of hook. As is well understood by those in the art, selection of hook size is made based on the fish being sought. For example, crappie would necessitate a smaller hook.

As mentioned above, locking tab 28 is adapted to contact ledge 37 and recess 36 at the bottom of weighted head 30. Thus locking tab 28 prevents the weighted head 30 from moving down shank 21. On the top portion of weighted head 30, ledge 35 associated with recess 34 is adapted to contact arm 25 of shoulder 40. Thus, upward movement of weight 30 is precluded. Therefore, once weight 30 has been installed as shown in FIG. 5, it is releasably retained in this position.

It will be observed from FIGS. 5 and 6 that there is a space 29 provided between shank 21 and member 27 such that shank 21 and member 27 may be moved proximate to one another thus defining the aforementioned release position. As seen in FIG. 5, axial bore 32 is sufficiently wide such that locking tab 28 is movable between a release position, wherein tab 28 is positioned immediately adjacent shank 21, and a locking position wherein locking tab 28 is positioned in a spaced relation from shank 21. Due to the construction of member 27, locking tab 28 is normally biased into the locking position.

When shank 21 and member 27 are positioned in the release position, locking member 28 will no longer contact ledge Consequently, weight 30 will be able to slide downwardly on shank 21, past locking tab 28, whereupon it may be removed from hook without having to disconnect hook 20 from line 60. Conversely, when the tab 28 is positioned in the outwardly spaced, locking position, downward movement of weight 30 is precluded due to contact between tab 28 and ledge 37. It will be further noted from the figures that locking tab 28 is constructed with a terminating member 128 which facilitates movement of the weight head 30 into the working position indicated in FIGS. 1–5 achieving a "snap fit."

This ease of removal and installation facilitates the use of weights 30 having different weight and color to fit the circumstances and conditions during use. For example, it may be desirable to use a greater weight on a windy day or to fish deeper. It may also be desirable to use a brighter color on cloudy days. Finally, it will be understood that weight 30 may be constructed of a variety of materials such as lead, steel, tin, bismuth, etc.

FIG. 7 is a side cross-sectional view of an alternative embodiment 100 of the present invention. In this alternative embodiment, the locking tab 129 is positioned on shank 121 as opposed to parallel member 127. As indicated above, many alternative configurations of the locking means are equally well suited to the invention. FIG. 7 is but one illustration of these alternative locking means placements.

FIG. 8 is a side view of another alternative working example for the weighted jig hook apparatus of the present invention. A component in the alternative embodiment of FIG. 7 having a function similar to a component xx in FIGS. 1–6, is identified as 1xx. As seen in this figure, a spinner 200 is used in conjunction with the weighted hook apparatus 1O of the present invention. In all other respects, the weighted jig hook apparatus 1O illustrated in FIG. 8 is identical to the earlier embodiments. Spinner 200 would be connected to the weighted jig hook apparatus 1O of the present invention by means of swivel 210. As seen in the figure, swivel 210 would be adapted to engage shoulder 40 at approximately the position where parallel member 27 meets arm 26. As seen above in FIG. 6, a slight gap exists between arm 26 and member 27 and arm 25 and shank 21. It is within this gap that the swivel 210 for spinner 200 would be slidably attached. As is well understood in the art, when the fishing line 60 is secured to eyelet 24 and the lure retrieved through the water, spinner 200 would spin about swivel 210. This adaptability for use with a spinner gives the weighted jig hook apparatus 10 of the present invention additional flexibility. Thus spinner 200 used in conjunction with the weighted jig hook 10 gives the fisherman additional flexibility in providing different presentations to the fish.

FIG. 9 is a cross-sectional side view of another alternative embodiment of the weighted jig hook apparatus 300 of the present invention. In this embodiment, locking tab 28 has been removed and replaced with a substantially straight parallel member 328. Additionally, the axial bore 332 has been modified slightly by incorporating an additional shoulder 333 at the upper end thereof as indicated in FIG. 9. Thus, a tight fit between weighted head 330 and hook 320 is achieved by a combination of the frictional engagement of shank 321 and member 328 with the internal sidewalls defining axial bore 332 in combination with the engagement of shoulder 333 and arm 326. It is envisioned that hook 320 would be manufactured in such a way that member 328 is urged outwardly from shank 321 to a position greater than that shown in the figure. Thus, when hook 320 is inserted into weighted jig head 330 as shown, there is a frictional pressure applied by member 328 against the interior walls of the weighted jig head 330 such that a frictionally tight fit is achieved therebetween. A component in the alternative embodiment of FIG. 9 having a function similar to a component xx in FIGS. 1–6, is identified as 3xx.

It is obvious that numerous other modifications and variations of the present invention are possible in view of the above teachings. For example, as already mentioned, the placement and type of locking tab used to secure the weight 30 in position are varied. Additionally, as already mentioned, the shape of the weighted head 30 may also be varied from the spherical shape illustrated in the figures, for example, in some situations, it might be more desirable to shape the weighted head in a bullet shape or egg shape. Additionally, it is also possible to envision a weighted jig hook apparatus which could be used with a treble or double hook.

Therefore, it is to be understood that the above description is in no way intended to limit the scope of protection of the claims and is representative of only a few of the several possible embodiments of the present invention.

Thus, there has been shown and described an invention which accomplishes at least all of the stated objectives.

I claim:

1. An improved weighted jig comprising:
   a fishhook having an elongated shank having first and second ends;
   a U-shaped hook secured to said first shank end;
   a shoulder attached to said shank second end and extending generally perpendicularly from said shank, said shoulder being formed by a member connected to said shank second end and folded back on itself, an eyelet for connection of a fishing line, being formed at the point of folding of said member back upon itself;
   locking means secured to said shoulder, said locking means being movable between a locking position and a release position; and
   a weighted jig head comprising a body having a top and bottom and an axial bore therethrough such that upon placement of said U-shaped hook in said axial bore and upon placement of said locking means in said release position, said weighted jig head may be slid upwardly on said shank into contact with said shoulder at said top of said weighted jig head whereupon said locking means may be placed in said locking position releasably retaining said weight in place.

2. The weighted jig apparatus of claim 1 wherein said weighted jig head further comprises a recess at said top of said body and positioned to receive said shoulder therein, said weighted jig head further comprising a recess in said bottom of said body adapted to contact said locking tab when said tab is moved to said locking position.

3. The weighted jig apparatus of claim 1 wherein said weighted jig head is generally spherical in shape.

4. The weighted jig apparatus of claim 1 wherein said fish hook, shoulder and locking means are integral parts of a single unitary piece.

5. The weighted jig apparatus of claim 1 wherein said locking means comprises an elongated member secured at one end to said shoulder and terminating in an outward bend defining a locking tab said locking tab movable between a locking position wherein said tab is in a spaced relation to said shank for engaging the bottom of the body of said weighted jig head, and a release position wherein said locking tab is immediately adjacent said shank for passage through said axial bore of the weighted jig head.

6. The weighted jig apparatus of claim 5 wherein locking tab comprises a bend in said elongated member said bend projecting outwardly from said shank.

7. An improved weighted jig comprising:
   a fishhook having
      an elongated shank having first and second ends;
      a U-shaped hook secured to said first shank end;
      a shoulder attached to said second end and terminating in an eyelet adapted for securement to a fishing line, said shoulder extending generally perpendicularly from said shank and being formed by a member having two ends and connected at one of said ends to said shank second end and folded back on itself said eyelet being formed at the end of said shoulder;
      locking means comprising an elongated member secured at one end to said shoulder second end and terminating in an outward bend defining a locking tab said locking tab movable between a locking position and a release position; and
   a weighted jig head comprising a body having a top and bottom and an axial bore therethrough such that upon placement of said U-shaped hook in said axial bore and upon placement of said locking tab in said release position, said weighted jig head may be slid upwardly on said shank into contact with said shoulder at said top of said weighted jig head whereupon said locking tab may be placed in said locking position engaging said bottom of said weighted jig head.

8. A weighted jig apparatus comprising:
   a fish hook having a shank with vertical portion, a perpendicular bend and a U-shaped hook at the top and bottom respectively, thereof, said perpendicular bend defining an arm terminating at one end in an eyelet rot attaching a fishing line thereto, said fish hook further comprising a shaft member positioned adjacent and generally parallel to said shank said shaft having a bend therein connecting said shaft to said eyelet, said shank having a locking tab positioned a the bottom end thereof for releasably engaging a weighted jig head, said locking tab being movable between a release position and a locking position for releasably retaining a weight thereon; and a weight adapted to be releasably retained on said fish hook having an axial bore therethrough adapted to receive said hook, shank and bend therethrough and to engage said locking tab for releasable securement of said weight on said fish hook.

9. In combination:

a fishhook having an elongated shank having first and second ends;

a U-shaped hook secured to said first shank end;

a shoulder attached to said shank second end and extending generally perpendicularly from said shank, said shoulder being formed by a member connected to said shank second end and folded back on itself, an eyelet for connection of a fishing line, being formed at the point of folding of said member back upon itself;

locking means secured to said shoulder, said locking means being movable between a locking position and a release position; and a weighted jig head comprising a body having a top and bottom and an axial bore therethrough such that upon placement of said U-shaped hook in said axial bore and upon placement of said locking means in said release position, said weighted jig head may be slid upwardly on said shank into contact with said shoulder at said top of said weighted jig head whereupon said locking means may be placed in said locking position releasably retaining said weight in place.

* * * * *